United States Patent
Borowski et al.

[11] 3,727,527
[45] Apr. 17, 1973

[54] PHOTOGRAPHIC APPARATUS WITH LIQUID CRYSTAL VOLTAGE INDICATOR

[75] Inventors: Kurt Borowski, Munich; Alfred Kubitzek, Munich Solln, both of Germany

[73] Assignee: Agfa-Gevaert Aktiengesellschaft, Leverkusen, Germany

[22] Filed: June 8, 1972

[21] Appl. No.: 261,038

[30] Foreign Application Priority Data

June 11, 1971 Germany.....................P 21 28 992.9

[52] U.S. Cl.................95/10 R, 350/160 R, 356/227
[51] Int. Cl...................................................G01j 1/42
[58] Field of Search..................350/160 R; 356/227; 95/10 R, 10 B, 10 CE

[56] References Cited

UNITED STATES PATENTS 3,096,271  7/1963  Hespenheide.................350/160 X
3,626,410  12/1971  de Koster...................350/160 X

*Primary Examiner*—Samuel S. Matthews
*Assistant Examiner*—Michael L. Gellner
*Attorney*—Michael S. Striker

[57] ABSTRACT

A still camera or motion picture camera wherein the exposure control circuit has an output at which the voltage is indicative of the prevailing scene brightness, of the selected aperture size, the selected exposure time and/or the sensitivity of film with which the camera is loaded. The output is connected with one electrode of a liquid crystal cell which is associated with a suitable scale to indicate the voltage at the output. If the voltage at the output is indicative of the aperture size, film speed and/or scene brightness, a reading of the scale (which is preferably observable by looking into the view finder) enables the user of the camera to properly select the exposure time. If the voltage at the output is indicative of the selected exposure time, film speed and/or scene brightness, the user can read the scale to properly adjust the aperture size. One of the two transparent electrodes in the liquid crystal cell may be of sinusoidal shape to further facilitate the determination of boundary between the transparent and non-transparent or differently colored portions of the liquid layer between the electrodes; such boundary travels in dependency on changes of voltage at the output.

10 Claims, 3 Drawing Figures

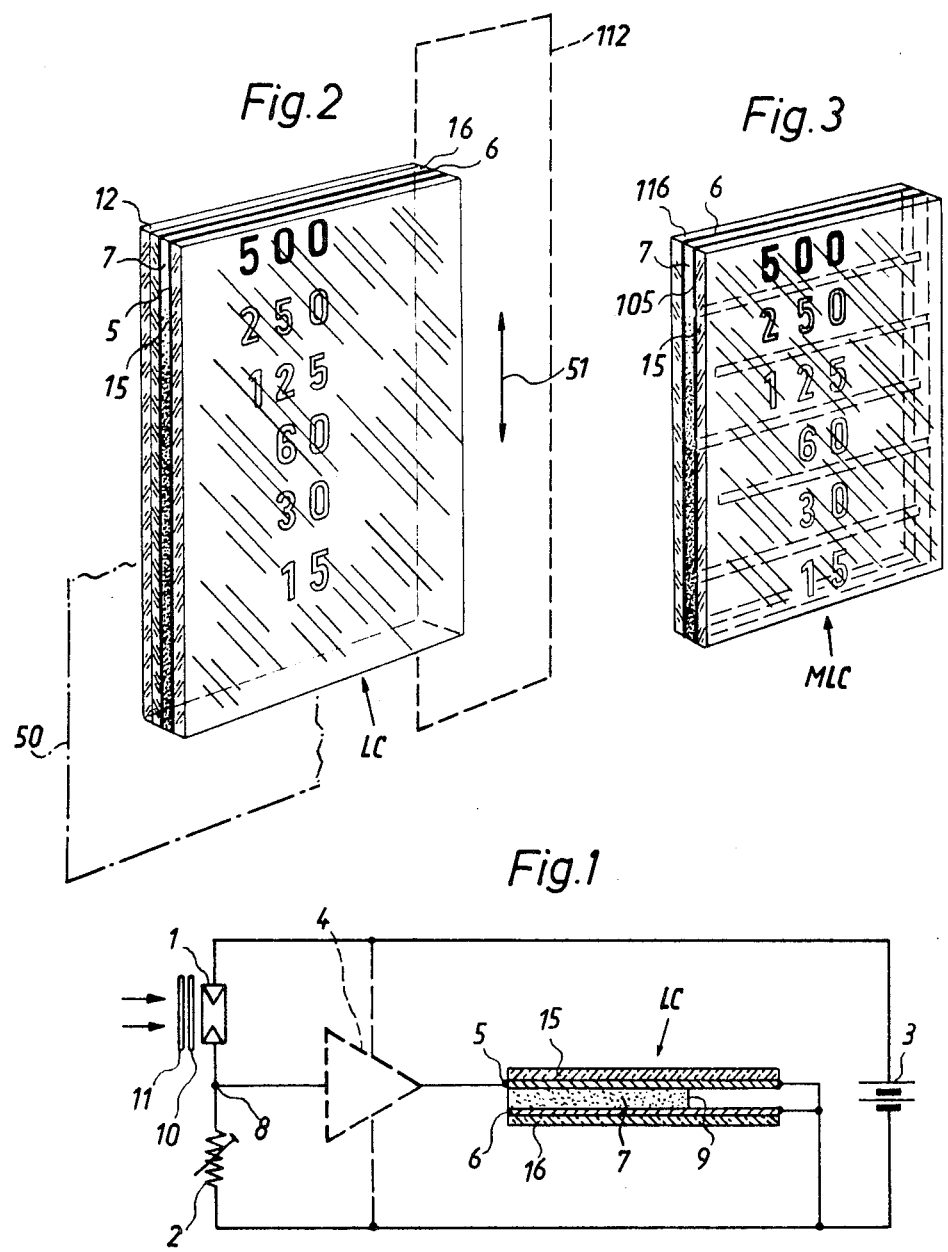

3,727,527

PHOTOGRAPHIC APPARATUS WITH LIQUID CRYSTAL VOLTAGE INDICATOR

BACKGROUND OF THE INVENTION

The present invention relates to photographic apparatus with electrical exposure controls, and more particularly to improvements in means for producing visible indications of one or more exposure values such as the size of the aperture furnished by a diaphragm, the exposure time, the brightness of scene light, the sensitivity of photographic film and/or a combination of two or more such values.

In presently known photographic apparatus, the electrical exposure control normally employs a moving-coil instrument which seves to indicate the magnitude of electromotive forces. A drawback of such instruments is that they must be constructed and adjusted with a high degree of precision, and also that they are highly sensitive to shocks so that their mounting in the body of a camera involves substantial expenditures in time and material. Thus, a moving-coil instrument must be installed with a view to reduce or eliminate the likelihood of damage or destruction during transport as well as in actual use of the camera. In spite of such precautions, the moving-coil instrument is still considered to be the most sensitive unit in a still camera or motion picture camera. If the moving-coil instrument serves for automatic selection of one or more exposure values, its destruction or improper operation renders the camera useless. If the moving-coil instrument merely serves to indicate one or more desirable exposure values, its failure to operate properly will also adversely affect the quality of exposures, especially if the camera is being used by a novice or an inexperienced amateur photographer.

Repair work upon a moving-coil instrument is a time-consuming and costly procedure, mainly because the instrument must be removed from and thereupon reinstalled in the camera body.

Another drawback of moving-coil instruments is that they, just as all other electromagnetic devices, consume substantial amounts of electrical energy. Since a modern photographic camera normally employs passive photoelectric elements, the exposure control must be powered by one or more batteries which are exhausted after relatively short periods of use. It was already proposed to reduce the consumption of electrical energy by interrupting the circuit of the moving-coil instrument immediately upon completion of an exposure or a series of successive exposures. This necessitates the use of additional electrical components and contributes to complexity, cost and sensitivity of the exposure control. Furthermore, a certain interval of time must elapse between the completion of exposure control circuit and the making of an exposure which adversely affects the convenience of manipulation and prevents the making of discrete exposures in rapid sequence.

SUMMARY OF THE INVENTION

An object of the invention is to provide a novel and improved voltage indicating instrument which can be used in a still camera or a motion picture camera as a simpler, more compact, more accurate, longer-lasting and less sensitive substitute for moving-coil instruments.

Another object of the invention is to provide a photographic apparatus with novel and improved means for visual indication of one or more selected or optimum exposure values, such as exposure time, f/stop, film speed and/or scene brightness.

A further object of the invention is to provide a photographic apparatus which embodies the improved indicating means.

An additional object of the invention is to provide an electrical exposure control system for use in still cameras or motion picture cameras with novel and improved voltage indicating means.

The invention is embodied in a still camera or motion picture camera which comprises an exposure control including an electric circuit having an output at which the voltage varies as a function of at least one of a plurality of parameters including scene brightness, the aperture size, the exposure time and the film speed, and indicating means for indicating the voltage at the output. In accordance with the invention, the indicating means comprises a liquid crystal cell having a layer of liquid crystal and two electrodes flanking the liquid crystal layer. One of the electrodes is connected with the output so that the difference of potential between the electrodes varies as a function of changes in voltage at the output with attendant changes in light transmissivity and/or coloration of different portions of the liquid crystal layer.

At least one of the electrodes is preferably transparent and the cell preferably further comprises or is associated with a scale calibrated to indicate different voltages at the output as a function of changes in the ratio of transparent and opaque or differently colored portions of the liquid crystal layer.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic view of an exposure control for use in photographic cameras which embodies the improved liquid crystal cell;

FIG. 2 is an enlarged perspective view of the liquid crystal cell shown in FIG. 1; and FIG. 3 is a perspective view of a modified liquid crystal cell.

DESCRIPTION OF THE PREFERRED EMBODIMENTS

FIG. 1 illustrates an electrical exposure control circuit in a still camera or motion picture camera. The circuit comprises a voltage divider including a photoelectric resistor 1 and a variable resistor 2. The voltage at the top 8 of the voltage divider is amplified by an output amplifier 4 and is applied to the leftmost point of a transparent electrode layer 5 forming part of a liquid crystal cell LC. The resistors 1 and 2 are connected in series with a battery 3 or an analogous energy source whose negative pole is connected with the right-hand end of the electrode 5 as well as with the right-hand end of a second transparent electrode 6 which registers with and is separated from the electrode by a liquid crystal layer 7. The electrodes 5, 6 are respectively applied to the inner sides of plate-like carriers 15, 16 of transparent glass.

The resistor 1 is exposed to scene light so that its ohmic resistance varies as a function of scene brightness. Thus, the voltage at the output 8 also varies as a function of scene brightness to thereby change the position of the boundary 9 between the light-transmitting and opaque or differently colored portions of the liquid crystal layer 7. The position of the boundary 9 between the left-hand and right-hand ends of the electrodes 5, 6 can be further influenced by means of light-weakening elements 10, 11 which can be placed into the path of incoming scene light in front of the photoelectric resistor 1. For example, light-weakening element 10 may constitute a circular wedge or filter having portions of different light-transmissivity and being movable relative to the resistor 1 as a function of changes in the size of the aperture defined by an adjustable diaphragm, not shown. The element 11 may constitute a second circular wedge or filter whose position is adjusted in response to insertion of photographic film into the camera body. For example, the container for unexposed film may be provided with encoded information which automatically adjusts the element 11 as a function of the speed of the respective film. Thus, in the embodiment of FIG. 1 the voltage at the output 8 is indicative of the film speed, of the selected aperture size and of the prevailing scene brightness.

The position of the boundary 9 between the light-transmitting and opaque portions of the liquid crystal layer 7 can be read with reference to a scale 12 shown in FIG. 2 to allow for appropriate adjustment of the shutter (not shown) so that the selected exposure time will be best suited for the making of an exposure with the preselected f/stop and with a film whose speed is indicated by the position of the filter 11.

The scale 12 of FIG. 2 is provided with a row of graduations each of which indicates a different exposure time. When the exposure control of FIG. 1 is in use, the prevailing scene brightness is assumed to be such that the boundary 9 is located between the graduations "250" and "500" and that the person looking at the cell LC will see only the uppermost graduation which is shown in FIG. 5 by heavy solid lines. The user of the camera then effects an appropriate adjustment of the shutter so that the latter will furnish an exposure time of 1/500 second. The scale 12 is shown in the form of a plate which is outwardly adjacent to the glass plate carrier 16 for the electrode 6. The entire cell LC can be mounted in the view finder 50 so that, by looking through the eyepiece of the view finder, the user of the camera can immediately detect the position of the boundary 9. The graduations located below the boundary 9 are obscured because the liquid crystal layer portion below the boundary is assumed to be opaque whereas the liquid crystal layer portion above the boundary 9 transmits light. The opacity of the liquid crystal layer portion below the boundary 9 depends on the nature of liquid crystal, on the voltage which is applied to the output 8 and on the nature of eventual coloring agent or agents in the liquid crystal. Thus, the opacity of the lower portion of the layer 7 shown in FIG. 2 may be total so that the graduations "15," "30," "60," "125" and "250" cannot be seen at all or partial so that these graduations are blurred sufficiently to indicate to the user that the proper exposure time at the prevailing scene brightness, with the preselected f/stop and with a film having a speed indicated by the position of the filter 11 will be 1/500 second.

If desired, the scale 12 can be replaced by a strip-shaped scale 112 which is laterally adjacent to the cell LC and is preferably movable lengthwise (arrow 51) to allow for adjustments as a function of the selected f/stop and/or film sensitivity.

It is further clear that the scale 12 or 112 may be provided with graduations representing various f/stops and that the filter 10 is then adjustable between plural positions each of which is indicative of a different exposure time.

When the exposure control of FIG. 1 is in use, the voltage between the electrodes 5 and 6 decreases in a direction from the left to the right due to resistance of the electrode 5 to the flow of electric current. The dynamic scattering in the liquid crystal layer 7 takes place at a certain voltage so that the position of the boundary 9 will invariably reflect the voltage at the output 8 and hence the intensity of light which reaches the resistor 1. Thus, the position of the boundary 9 relative to the scale 12 will indicate the prevailing scene brightness modified by the selected f/stop and the film speed. If the layer 7 does not contain any coloring agents, the right-hand position of the layer 7 will remain transparent whereas the other portion of the layer 7 (to the left of the boundary 9) will either obscure or completely conceal the graduations therebehind. If the layer 7 does contain a coloring agent, the liquid crystal layer portion to the left of the boundary 9 will be colored whereas the remaining portion of the layer 7 will remain transparent or will exhibit a different color.

The mode of operation of liquid crystal cells which can be used in accordance with the present invention is described, for example, in the article beginning on page 72 of "Electro-optical Systems Design," Vol. 2, No. 1, January, 1970 and in "Applied Physics Letters," Vol. 13, No. 3, pg. 91, August, 1968. Such cells were found to be useful for display purposes and the like; however, they were not employed or suggested to be used in exposure controls of photographic apparatus to serve as compact, rugged, accurate, inexpensive and reliable substitutes for moving-coil instruments or other conventional voltage meters. The aforementioned article also discloses various electrode spacers. By adding to the liquid crystal layer various coloring agents, the changes in light-transmissivity of the liquid crystal layer can be accompanied by changes in color to further facilitate the reading of the associated scale.

Greater durability of liquid crystal voltage indicators is attributable to the fact that they need not employ any moving parts. Their cost is only a small fraction of the cost of a moving-coil instrument.

FIG. 3 illustrates a modified liquid crystal cell MLC wherein the scale 12 or 112 is omitted and the graduations representing various exposure times are applied directly to (for example, etched into) the glass plate carrier 116. Furthermore, the electrode 105 at the inner side of the glass plate carrier 15 is of sinusoidal or meandering shape in order to insure a desirable mathematical relationship between the applied voltage and the movement of boundary between the light-transmitting and opaque portions of the liquid crystal layer 7. As the voltage at the point 8 increases, the opacity of the liquid crystal layer 7 increases along the meandering electrode 105. Therefore, the transition or boundary between the opaque and light-transmitting portions of the layer 7 in the direction of graduations on the plate 116 is more readily discernible that in the longitudinal direction of the electrodes 105 and 6.

The improved photographic apparatus is susceptible of many additional modifications. For example, the signals indicating the preselected exposure value or values (such as the f/stop and/or the film speed) can be furnished by appropriate adjustment of the variable resistor 2 or another resistor. Furthermore, and as mentioned above, the scale 12, 112 or 116 can be provided with graduations which indicate various f/stops or proper combinations of f/stops and exposure times for different scene brightnesses. Still further, the entire cell LC or MLC may be mounted in a separate window of the camera body. The scale 12, 112 and/or 116 may consist of opaque material with transparent or translucent graduations, or vice versa, and the numerals shown in FIGS. 2 and 3 can be replaced by other types of symbols (such as a sun symbol representing a relatively short exposure time, a cloud symbol representing an exposure time of medium length, and a thunderbolt symbol indicating that the subject or scene should be exposed to artificial light and that the shutter is to be set to furnish a short exposure time). The configuration of electrodes 5, 6 and/or 105, 6 can deviate from the illustrated configuration.

Without further analysis, the foregoing will so fully reveal the gist of the present invention that others can, be applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letter Patent is set forth in the appended claims:

1. In a photographic apparatus, a combination comprising an exposure control including an electric circuit having an output at which the voltage varies as a function of changes in at least one of a plurality of parameters including the exposure time, aperture size, scene brightness and film speed; and indicating means for indicating the voltage at said output, including a liquid crystal cell having a layer of liquid crystal and two electrodes flanking said layer, one of said electrodes being connected with said output so that the difference of potential between said electrodes varies as a function of changes in voltage at said output with attendant changes in light transmissivity of different portions of said layer.

2. A combination as defined in claim 1, wherein said electrodes are transparent and further comprising scale means associated with said layer and calibrated to indicate different voltages at said output as a function of changes in the ratio of transparent and non-transparent or differently colored portions of said layer.

3. A combination as defined in claim 2, further comprising view finder means, said scale being observable by looking into said view finder means.

4. A combination as defined in claim 2, wherein said scale registers with said layer.

5. A combination as defined in claim 4, wherein said scale is outwardly adjacent to one of said electrodes and is observable through said layer.

6. A combination as defined in claim 2, wherein said scale is adjacent to one edge portion of said layer.

7. A combination as defined in claim 2, wherein said cell further comprises a transparent plate-like carrier for at least one of said electrodes and said scale forms part of said carrier.

8. A combination as defined in claim 1, wherein one of said electrodes is of meandering shape.

9. A combination as defined in claim 1, wherein said output is the intermediate tap of a voltage divider which forms part of said circuit and includes a pair of resistors one of which is variable as a function of changes in scene brightness.

10. A combination as defined in claim 9, wherein said circuit further comprises an energy source and said voltage divider comprises two additional taps connected with different poles of said energy source, one of said poles being further connected with said electrodes and the point of connection between said one pole and said one electrode being remote from the point of connection between said one electrode and said output.

* * * * *